United States Patent
Wei et al.

(10) Patent No.: US 11,067,984 B2
(45) Date of Patent: Jul. 20, 2021

(54) AUTOMATED VEHICLE OPERATING SYSTEM WITH DRIVING-RULE MODIFICATION BASED ON OBSERVATION OF ANOTHER VEHICLE

(71) Applicant: Motional AD LLC, Boston, MA (US)

(72) Inventors: Junqing Wei, Bridgeville, PA (US);
Wenda Xu, Pittsburgh, PA (US);
Jarrod M. Snider, Troy, MI (US);
Jong Ho Lee, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 40 days.

(21) Appl. No.: 16/099,169

(22) PCT Filed: Apr. 19, 2017

(86) PCT No.: PCT/US2017/028248
§ 371 (c)(1),
(2) Date: Nov. 5, 2018

(87) PCT Pub. No.: WO2017/192261
PCT Pub. Date: Nov. 9, 2017

(65) Prior Publication Data
US 2019/0212734 A1 Jul. 11, 2019

Related U.S. Application Data

(63) Continuation of application No. PCT/CT2017/028248, filed on Apr. 19, 2017, which
(Continued)

(51) Int. Cl.
*G05D 1/00* (2006.01)
*G05D 1/02* (2020.01)

(52) U.S. Cl.
CPC ......... *G05D 1/0088* (2013.01); *G05D 1/0223* (2013.01); *G05D 1/0287* (2013.01);
(Continued)

(58) Field of Classification Search
CPC ............................. G01R 31/005; G01R 27/005
See application file for complete search history.

(56) References Cited

U.S. PATENT DOCUMENTS 8,457,827 B1 * 6/2013 Ferguson ........ B60W 30/18163
701/23
8,880,272 B1 * 11/2014 Ferguson .............. B60W 10/20
701/26
(Continued)

FOREIGN PATENT DOCUMENTS

CN        102150188        8/2011
CN        103935361        7/2014
(Continued)

OTHER PUBLICATIONS

EP Extended Search Report in European Application No. EP17792995, dated Mar. 29, 2019, 7 pages.
(Continued)

*Primary Examiner* — Jess Whittington
(74) *Attorney, Agent, or Firm* — Fish & Richardson P.C.

(57) ABSTRACT

A driving-rule system (10) suitable to operate an automated includes a vehicle-detector (16) and a controller (20). The vehicle-detector (16) is suitable for use on a host-vehicle (12). The vehicle-detector (16) is used to detect movement of an other-vehicle (14) proximate to the host-vehicle (12). The controller (20) is in communication with the vehicle-detector (16). The controller (20) is configured to operate the host-vehicle (12) in accordance with a driving-rule (22), detect an observed-deviation (24) of the driving-rule (22) by the other-vehicle (14), and modify the driving-rule (22) based on the observed-deviation (24).

20 Claims, 3 Drawing Sheets

Related U.S. Application Data is a continuation of application No. 15/146,534, filed on May 4, 2016.

(52) U.S. Cl.
CPC .............. *B60Y 2300/18166* (2013.01); *G05D 2201/0213* (2013.01)

(56) References Cited

U.S. PATENT DOCUMENTS

| | | | |
|---|---|---|---|
| 2003/0060973 A1 | 3/2003 | Mathews et al. | |
| 2006/0095195 A1* | 5/2006 | Nishimura | B60W 30/025 701/96 |
| 2007/0142995 A1* | 6/2007 | Wotlermann | B60W 30/16 701/96 |
| 2008/0162027 A1* | 7/2008 | Murphy | G05D 1/0246 701/117 |
| 2009/0079839 A1 | 3/2009 | Fischer et al. | |
| 2009/0271084 A1* | 10/2009 | Taguchi | B60W 30/16 701/96 |
| 2010/0256836 A1 | 10/2010 | Mudalige | |
| 2010/0274440 A1* | 10/2010 | Kim | G07C 5/008 701/31.4 |
| 2012/0136570 A1* | 5/2012 | Yamashita | G08G 1/0137 701/437 |
| 2013/0184926 A1 | 7/2013 | Spero et al. | |
| 2013/0297172 A1 | 11/2013 | Ariga et al. | |
| 2014/0176350 A1 | 6/2014 | Niehsen et al. | |
| 2014/0236414 A1* | 8/2014 | Droz | G08G 1/166 701/28 |
| 2015/0149017 A1* | 5/2015 | Attard | B60W 30/18163 701/23 |
| 2016/0180707 A1* | 6/2016 | MacNeille | B60W 40/04 701/117 |
| 2017/0249848 A1 | 8/2017 | Niino et al. | |
| 2019/0212734 A1 | 7/2019 | Wei et al. | |

FOREIGN PATENT DOCUMENTS

| | | |
|---|---|---|
| CN | 104648284 | 5/2015 |
| JP | 2015-044432 | 3/2015 |
| WO | WO 2014140107 | 9/2014 |

OTHER PUBLICATIONS

PCT International Preliminary Report on Patentability in International Application No. PCT/US2017/028248, dated Nov. 6, 2018, 6 pages.

PCT International Search Report and Written Opinion in International Application No. PCT/US2017/028248, dated Jul. 20, 2017, 7 pages.

\* cited by examiner

AUTOMATED VEHICLE OPERATING SYSTEM WITH DRIVING-RULE MODIFICATION BASED ON OBSERVATION OF ANOTHER VEHICLE

CROSS-REFERENCE TO RELATED APPLICATIONS

This application is a U.S. National Phase Application of International Patent Application No. PCT/US2017/028248 filed on Apr. 19, 2017, which claims priority to the benefit of U.S. patent application Ser. No. 15/146,534 entitled "AUTOMATED VEHICLE OPERATING SYSTEM WITH DRIVING-RULE MODIFICATION BASED ON OBSERVATION OF ANOTHER VEHICLE" filed on May 4, 2016, which is herein incorporated by reference in its entirety both of which are incorporated herein by reference in their entirety.

TECHNICAL FIELD OF INVENTION

This disclosure generally relates to a driving-rule system suitable to operate an automated vehicle, and more particularly relates to a system that operates a host-vehicle in accordance with a driving-rule, detects an observed-deviation of the driving-rule by another-vehicle, and modifies the driving-rule based on the observed-deviation.

BACKGROUND OF INVENTION

Automated or autonomous vehicle are generally programmed to operate in accordance with, i.e. observe, traffic-laws. Automated vehicles may also be programmed to operate in accordance with driving-rules or guidelines so the automated vehicles behave in a predictable manner. However, in some circumstances strict adherence to these driving-rules may inhibit the general flow of traffic.

SUMMARY OF THE INVENTION

In accordance with one embodiment, a driving-rule system suitable to operate an automated vehicle is provided. The system includes a vehicle-detector and a controller. The vehicle-detector is suitable for use on a host-vehicle. The vehicle-detector is used to detect movement of an other-vehicle proximate to the host-vehicle. The controller is in communication with the vehicle-detector. The controller is configured to operate the host-vehicle in accordance with a driving-rule, detect an observed-deviation of the driving-rule by the other-vehicle, and modify the driving-rule based on the observed-deviation.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
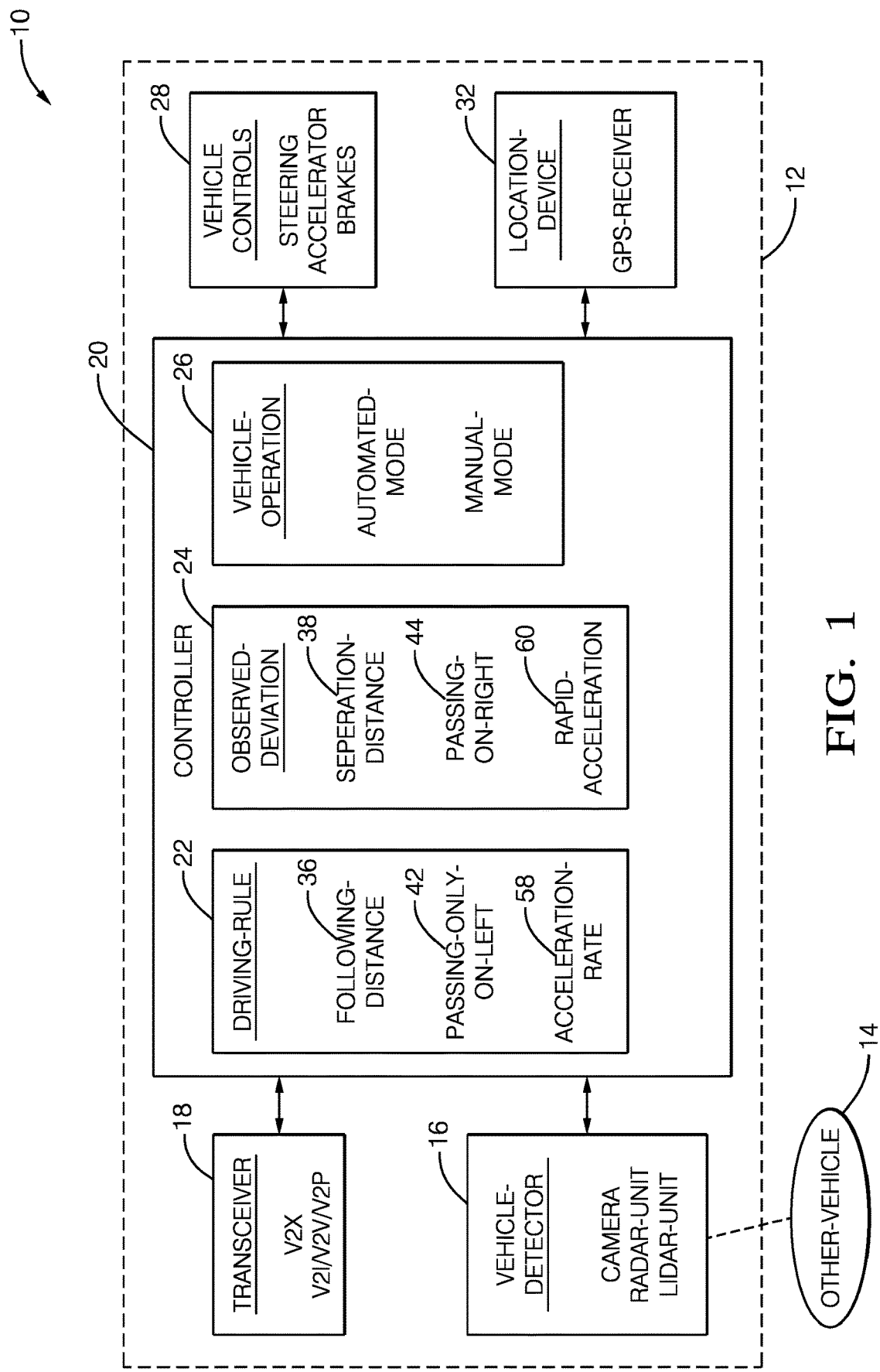
FIG. 1 is a diagram of a driving-rule system in accordance with one embodiment.

FIG. 1 illustrates a non-limiting example of a driving-rule system 10, hereafter referred to as the system 10. The system 10 is generally suitable to operate an automated vehicle or autonomous vehicle, hereafter referred to as the host-vehicle 12. While the non-limiting examples presented herein are generally related to fully-automated vehicles, i.e. autonomous-vehicles, it is contemplated that the teachings presented herein are also applicable to vehicles that are less than fully-automated, i.e. partially-automated, where an operator (not shown) may manually control some aspect of the host-vehicle 12 such the steering, but the operation of the accelerator and brakes is automated to maintain a predetermined distance behind an other-vehicle 14 forward of the host-vehicle 12.

The system 10 includes a vehicle-detector 16 suitable for use on the host-vehicle 12. By way of example and not limitation, the vehicle-detector 16 may include any one or combination of a camera, a radar-unit, a lidar-unit, an ultrasonic-transducer, or any other sensor technology useful to detect the other-vehicle 14 or objects proximate to the host-vehicle 12. The vehicle-detector 16 is generally used to detect movement of the other-vehicle 14 relative to the host-vehicle 12 and/or any other objects or other vehicles proximate to the host-vehicle 12. The function of the vehicle-detector 16 may also be provided or supplemented by a transceiver 18 configured for vehicle-to-infrastructure (V2I) communications, vehicle-to-vehicle (V2V) communications, and/or vehicle-to-pedestrian (V2P) communications, which may be generically labeled as V2X communications.

The system 10 also includes a controller 20 in communication with the vehicle-detector 16. Signals sent from the vehicle-detector 16 and/or the transceiver 18 may be used to determine the relative speed and/or direction of travel of the other-vehicle 14. The controller 20 is generally configured to operate the host-vehicle 12 in accordance with a driving-rule 22. As used herein, the driving-rule 22 is distinguished from a traffic-law such as posted-speed limit as violating the driving-rule 22 does not imply that an infraction of traffic-laws has or will occur.

What constitutes the driving-rule 22 will become apparent in view of the several examples of the driving-rule 22 given below. It will also become apparent how strict adherence to the driving-rule 22 can sometimes result in reduced overall traffic efficiency, so in some situations it may be advantageous to violate or modify, possibly temporarily, the driving-rule 22 with the benefit being an increase in overall traffic efficiency. The decision to violate or modify the driving-rule 22 may be based on the detection of an observed-deviation 24 of the driving-rule 22 by the other-vehicle 14. That is, the modification of the driving-rule 22 may be based on the observed-deviation 24.

The operation of the host-vehicle 12 in accordance with the driving-rule 22 determines the behavior of the vehicle-operation 26 whether the host-vehicle 12 is being operated in an automated-mode, a manual-mode, or a partial blending of the automated-mode and the manual-mode. The driving-rule 22 is then influential as to how aggressively the vehicle-controls 28 are operated. The system 10 may also include a location-device 32 used to determine a location on a digitalmap (not shown) so the system 10 can 'remember' locations where violation or modification of the driving-rule 22 occurs repeatedly.

Figure 2:
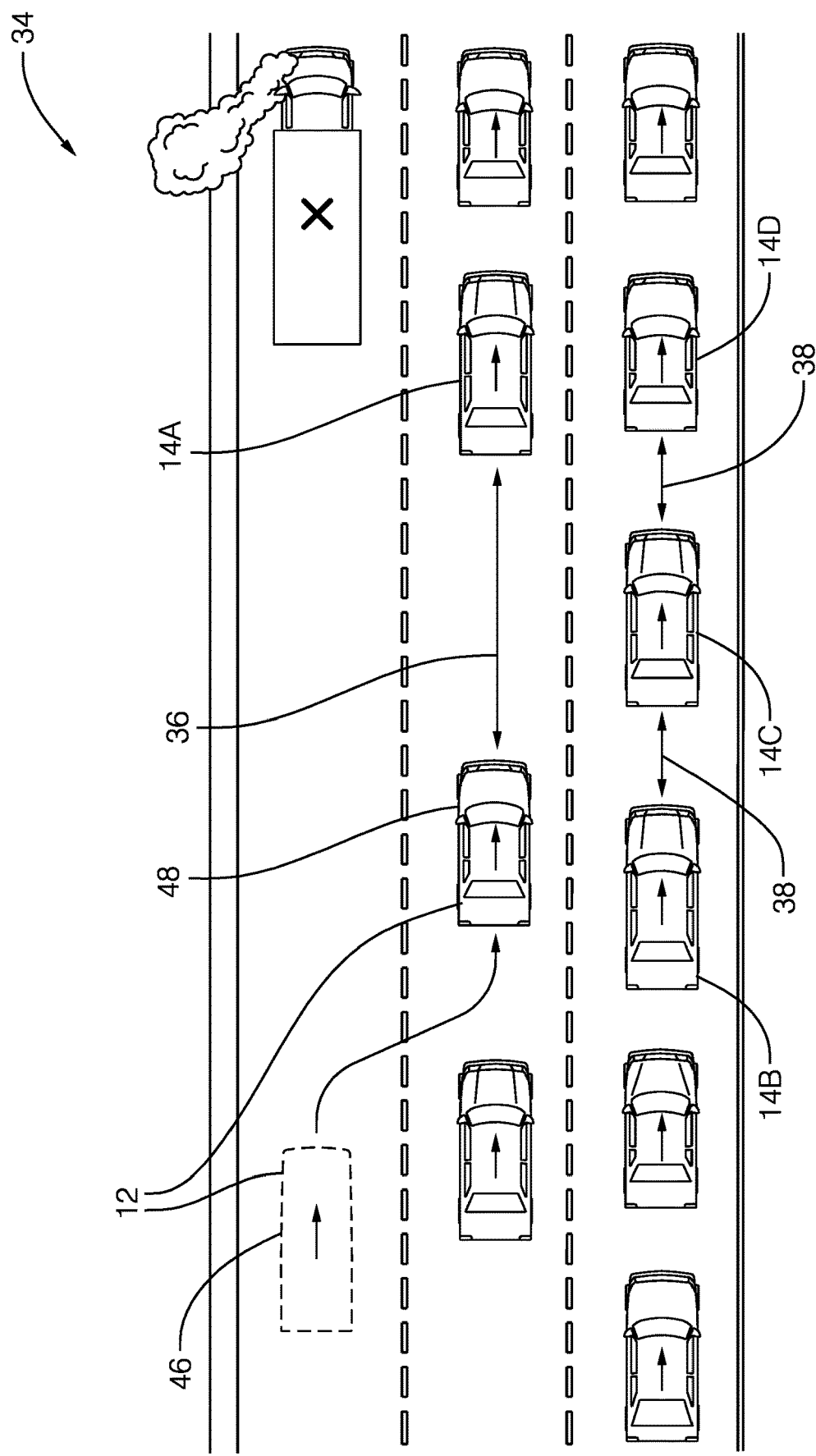
FIG. 2 is a traffic scenario encountered by the system of FIG. 1 in accordance with one embodiment.

FIG. 2 illustrates a non-limiting example of a traffic-scenario 34. A non-limiting example of the driving-rule 22 may be a following-distance 36 that the host-vehicle 12 maintains or exceeds when following the other-vehicle 14A. The following-distance 36 may be a preprogrammed value stored in the controller 20. The observed-deviation 24 observed by the system 10 using the vehicle-detector 16 and/or the transceiver 18 may be a separation-distance 38 between other-vehicles 14B, 14C, 14D proximate to the host-vehicle 12 that is substantially different from the following-distance, e.g. less than 80% of the following-distance 36. If the system 10 observes that the typical value of the separation-distance 38 is substantially less than the stored value of the following-distance 36, the system 10 may modify the following-distance 36 based on the separation-distance 38. That is, the following-distance 36 may be decreased to, for example, an average of the observed value of the separation-distance 38 between the other-vehicles 14B, 14C, 14D. The modified value of the following-distance 36 may be temporarily or permanently maintained, or may only be used when the host-vehicle is traveling on the roadway illustrated in FIG. 2 as indicated by the location-device 32.

Continuing to refer to FIGS. 1 and 2, the host-vehicle 12 may encounter a stalled-truck 40 stalled in the left-lane of the roadway. A non-limiting example of the driving-rule 22 may be passing-only-on-left 42. That is, the system 10 may be pre-programmed to only allow the host-vehicle 12 to only pass any other vehicle on the left-hand side of the other-vehicle. However, if the observed-deviation 24 is a passing-on-right 44 by, the other-vehicles 14A, 14D for example, then the driving-rule 22 may be temporarily modified to allow passing-on-right by the host-vehicle 12. As illustrated, the host-vehicle may change-lanes from a prior-location 46 to a current-location 48 in preparation to pass the stalled-truck 40 on the right-hand side of the stalled-truck 40. As before, this modification may be a temporary modification so the driving-rule 22 is reset to the passing-only-on-left 42 after a few minutes.

Figure 3:
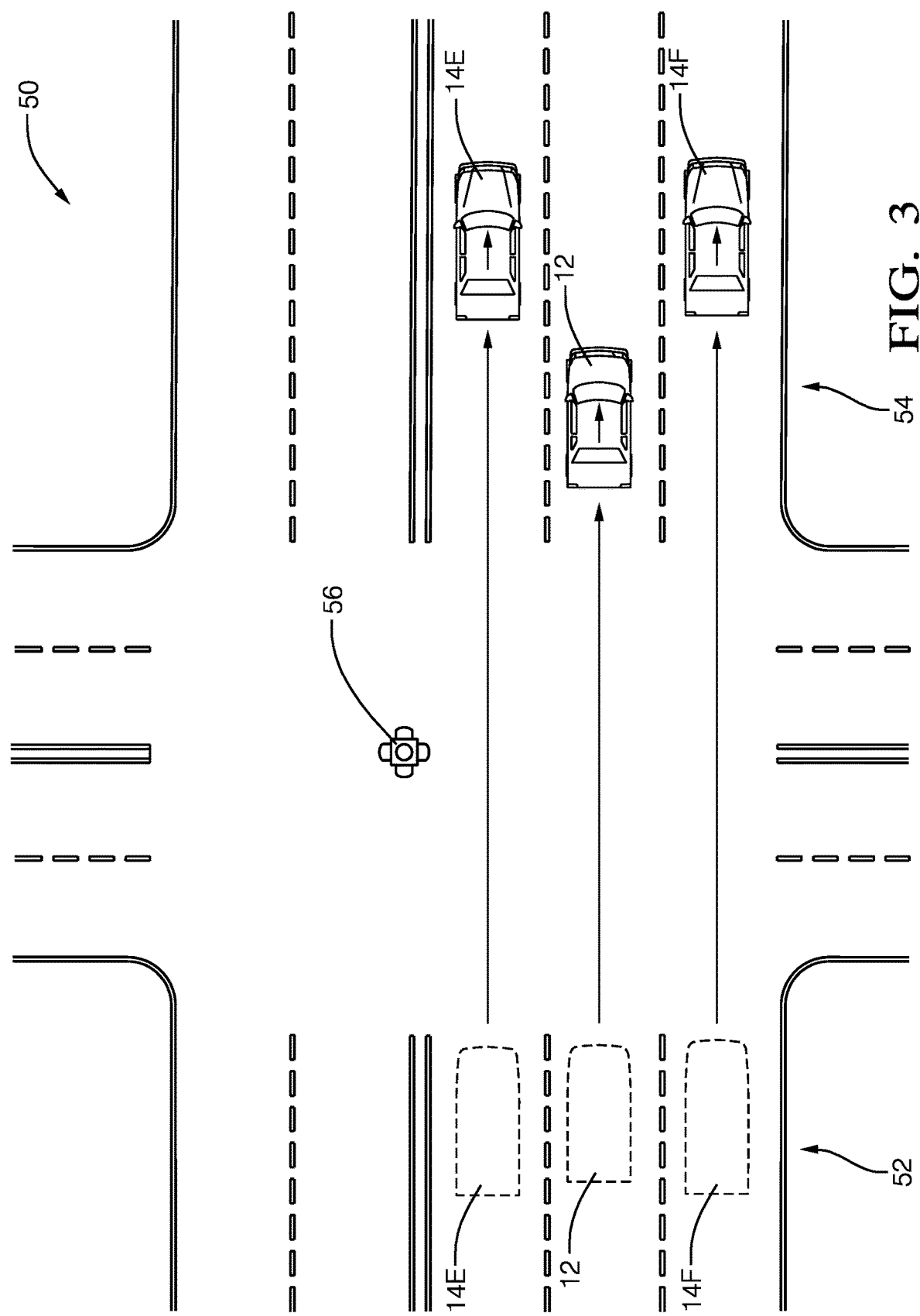
FIG. 3 is a traffic scenario encountered by the system of FIG. 1 in accordance with one embodiment.

FIG. 3 illustrates another non-limiting example of a traffic-scenario 50 where the host-vehicle 12 and other-vehicles 14E, 14F are previously located at a prior-position 52 and are subsequently located at a current-position 54 after a traffic-signal 56 changes from red to green. The driving-rule 22 for the host-vehicle 12 may include an acceleration-rate 58 previously programmed into the controller 20. However, if the observed-deviation 24 is rapid-acceleration 60 by the other-vehicles 14E, 14F that is greater than the acceleration-rate 58 such that after reaching the current-position 54 the host-vehicle 12 is substantially behind the other-vehicles 14E and 14F, then the relatively slow acceleration by the host-vehicle 12 may unnecessarily impede following-vehicles (not shown) located behind the host-vehicle 12 and the other-vehicles 14E, 14F, possibly causing unnecessary lane-changes by the following-vehicles. Accordingly, the acceleration-rate 58 of the host-vehicle 12 may be increased to better correspond to the local driving habits exhibited by the other-vehicles 14E, 14F.

By way of further non-limiting examples, the driving-rule 22 may include a waiting-time (not shown) that the host-vehicle 12 waits at a yield-sign and/or a stop-sign before proceeding. The controller 20 may be configured to observe the waiting-time even if there are no other vehicles near the host-vehicle 12. For example, the controller 20 may be pre-programmed to wait for one second (1 s) at a stop-sign before proceeding. However, if the other-vehicle 14 or other vehicles are observed (the observed-deviation 24) as waiting at stop signs for substantially more or less than the pre-programmed waiting-time, e.g. >1.5 s or less than 0.5 s, then the controller 20 may adjust the waiting time (the driving-rule 22).

By way of another non-limiting example, the driving-rule 22 may include a lateral-avoidance-distance (not shown) that the host-vehicle 12 maintains for clearance when passing a pedestrian or bicyclist (not shown) traveling on or near the edge of the roadway, two-meters (2 m) for example. However, if the observed-deviation is that the other-vehicle 14 or other vehicles typically steer to provide three or more meters (>3 m), then the controller 20 may modify the driving-rule 22 accordingly.

By way of another non-limiting example, the driving-rule 22 may include a steering-accuracy (not shown) that is a measure of how accurate the host-vehicle is steered to follow the center of the travel-lane. It has been observed that some human-operators tend to drive closer to the edge of the travel-lane when a roadway is curvy to allow for additional clearance for unseen until the last instant opposing traffic. If the controller 20 observes that the observed-deviation 24 is that most other vehicles are right-of-center rather than not centered, the controller 20 may adjust the driving-rule 22 accordingly.

Accordingly, a driving-rule system (the system 10), a controller 20 for the system 10 and a method of operating the system 10 is provided. While preprogramming of the driving-rule 22 may have been based on a desire for an exceptionally smooth or leisurely ride in the host-vehicle 12, local driving habits exhibited the other-vehicle 14 and/or the other-vehicles 14A, 14B, 14C, 14D, 14E, 14F may indicate that the driving-rule 22 be modified so the behavior of the host-vehicle 12 better corresponds with the local driving habits.

While this invention has been described in terms of the preferred embodiments thereof, it is not intended to be so limited, but rather only to the extent set forth in the claims that follow.

We claim:

1. A driving-rule system to operate a host vehicle, wherein the system comprises:
a vehicle-detector for use on the host vehicle, wherein the vehicle-detector is to detect movement of another vehicle that is proximate to the host vehicle; and
a controller that is communicatively coupled with the vehicle-detector, wherein the controller is to:
identify an object;
identify, based on the object, a driving-rule related to operation of the host vehicle, wherein the driving-rule relates to a first action that the host vehicle is to take with respect to the object;
identify, based on application of the driving-rule to the movement of the other vehicle, that the other vehicle has deviated from the driving-rule;
identify, based on the deviation of the other vehicle from the driving-rule, that the driving-rule is to be updated;
update the driving-rule, wherein the update includes a change to the driving-rule that is based at least in part on the deviation of the other vehicle from the driving-rule such that the driving-rule relates to a second action that the host vehicle is to take with respect to the object, and wherein the first action and second action are different from one another; and autonomously operate the host vehicle to take the second action with respect to the object in accordance with the updated driving-rule.

2. The driving-rule system of claim 1, wherein the driving-rule relates to a following-distance between the host vehicle and a vehicle adjacent to the host vehicle.

3. The driving-rule system of claim 1, wherein the driving-rule relates to a side of a vehicle on which the host-vehicle is allowed to pass.

4. The driving-rule system of claim 1, wherein the driving-rule relates to an acceleration rate of the host vehicle.

5. The driving-rule system of claim 1, wherein the driving-rule relates to a waiting time at a stop sign or a yield sign.

6. The driving-rule system of claim 1, wherein the driving-rule relates to a steering-accuracy of the host vehicle.

7. The driving-rule system of claim 1, wherein the host vehicle comprises an autonomous vehicle.

8. One or more non-transitory computer-readable media comprising instructions that, upon execution of the instructions by a controller of an autonomous host vehicle, are to cause the controller to:
identify an object;
identify, based on the object, a driving-rule related to operation of the host vehicle,
wherein the driving-rule relates to a first action that the host vehicle is to take with respect to the object;
identify, based on application of the driving-rule to movement of another vehicle, that the other vehicle has deviated from the driving-rule;
identify, based on the deviation of the other vehicle from the driving-rule, that the driving-rule is to be updated;
update the driving-rule, wherein the update includes a change to the driving-rule that is based at least in part on the deviation of the other vehicle from the driving-rule such that the driving-rule relates to a second action that the host vehicle is to take with respect to the object, and wherein the first action and second action are different from one another; and
operate the autonomous host vehicle to take the second action with respect to the object in accordance with the updated driving-rule.

9. The one or more non-transitory computer-readable media of claim 8, wherein the driving-rule relates to a following-distance between the host vehicle and a vehicle adjacent to the host vehicle.

10. The one or more non-transitory computer-readable media of claim 8, wherein the driving-rule relates to a side of a vehicle on which the host vehicle is allowed to pass.

11. The one or more non-transitory computer-readable media of claim 8, wherein the driving-rule relates to an acceleration rate of the host vehicle.

12. The one or more non-transitory computer-readable media of claim 8, wherein the driving-rule relates to a waiting time at a stop sign or a yield sign.

13. The one or more non-transitory computer-readable media of claim 8, wherein the driving-rule relates to a steering-accuracy of the host vehicle.

14. A host vehicle comprising:
a vehicle-detector that is to detect movement of another vehicle; and
a controller that is communicatively coupled with the vehicle-detector, wherein the controller is to:
identify an object;
identify, based on the object, a driving-rule related to operation of the host vehicle, wherein the driving-rule relates to a first action that the host vehicle is to take with respect to the object;
identify, based on application of the driving-rule to the movement of the other vehicle, that the other vehicle has deviated from the driving-rule;
identify, based on the deviation of the other vehicle from the driving-rule, that the driving rule is to be updated;
update the driving-rule, wherein the update includes a change to the driving-rule that is based at least in part on the deviation of the other vehicle from the driving rule such that the driving-rule relates to a second action that the host vehicle is to take with respect to the object, and wherein the first action and second action are different from one another; and
operate the host vehicle to take the second action with respect to the object in accordance with the updated driving-rule.

15. The host vehicle of claim 14, wherein the driving-rule relates to a following-distance between the host vehicle and a vehicle adjacent to the host vehicle.

16. The host vehicle of claim 14, wherein the driving-rule relates to a side of a vehicle on which the host vehicle is allowed to pass.

17. The host vehicle of claim 14, wherein the driving-rule relates to an acceleration rate of the host vehicle.

18. The host vehicle of claim 14, wherein the driving-rule relates to a waiting time at a stop sign or a yield sign.

19. The host vehicle of claim 14, wherein the driving-rule relates to a steering accuracy of the host-vehicle.

20. The host vehicle of claim 14, wherein the host vehicle comprises an autonomous vehicle.

* * * * *